(12) United States Patent
Daniels et al.

(10) Patent No.: US 6,744,243 B2
(45) Date of Patent: Jun. 1, 2004

(54) SYSTEM AND METHOD FOR DYNAMICALLY REGULATING A STEP DOWN POWER SUPPLY

(75) Inventors: David G. Daniels, Dallas, TX (US); Dale J. Skelton, Plano, TX (US); Ayesha I. Mayhugh, Richardson, TX (US); David A. Grant, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 346 days.

(21) Appl. No.: 09/895,959

(22) Filed: Jun. 28, 2001

(65) Prior Publication Data

US 2003/0001551 A1 Jan. 2, 2003

(51) Int. Cl.$^7$ ................................................. G05F 1/44
(52) U.S. Cl. ....................................... 323/284; 323/280
(58) Field of Search ................................ 323/266, 280, 323/284, 299, 303, 314, 316; 363/147

(56) References Cited

U.S. PATENT DOCUMENTS 6,201,375 B1 * 3/2001 Larson et al. ........... 323/280 X
6,351,110 B1 * 2/2002 Pappalardo et al. .... 323/316 X

* cited by examiner

*Primary Examiner*—Jessica Han
(74) *Attorney, Agent, or Firm*—J. Dennis Moore; W. James Brady, III; Frederick J. Telecky, Jr.

(57) ABSTRACT

A low gain feedback compensation circuit is provided on an integrated circuit. The feedback compensation circuit is coupled to a step down power supply on the integrated circuit. The step down power supply is operable to receive an input voltage and to generate an output voltage based on the input voltage. The feedback compensation circuit includes a line regulation circuit. The line regulation circuit is operable to receive the input voltage and a reference voltage. The line regulation circuit is also operable to generate an offset voltage based on the input voltage and the reference voltage.

19 Claims, 4 Drawing Sheets

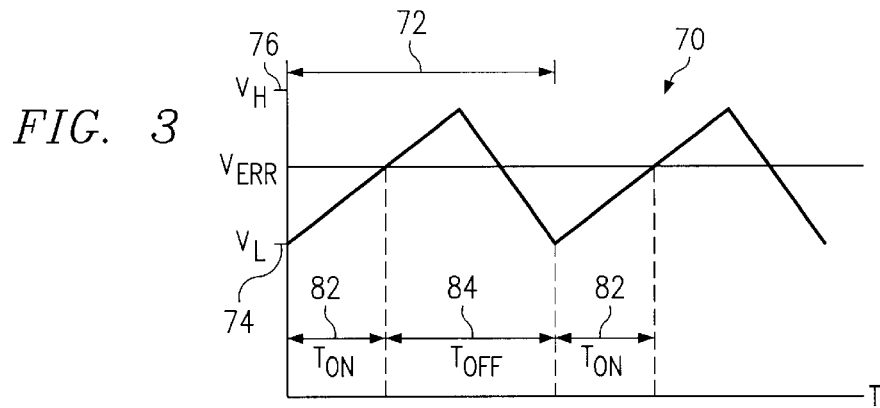
FIG. 3
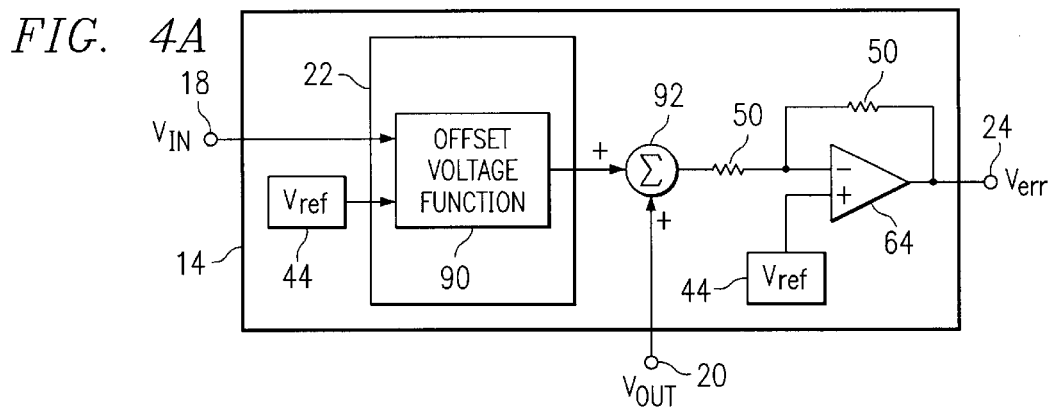
FIG. 4A
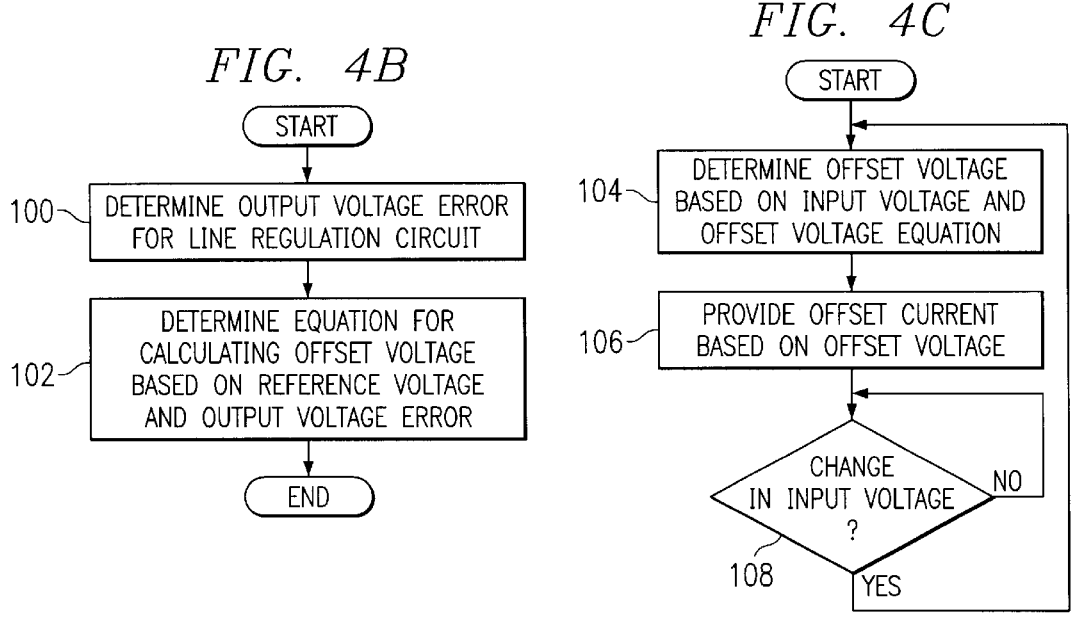
FIG. 4B
FIG. 4C

SYSTEM AND METHOD FOR DYNAMICALLY REGULATING A STEP DOWN POWER SUPPLY

TECHNICAL FIELD OF THE INVENTION

This invention relates generally to the field of semiconductor devices and more particularly to a system and method for dynamically regulating a step down power supply.

BACKGROUND OF THE INVENTION

Modern electronic equipment such as televisions, telephones, radios and computers are generally constructed of solid state devices. Integrated circuits are preferred in electronic equipment because they are extremely small and relatively inexpensive. Additionally, integrated circuits are very reliable because they have no moving parts but are based on the movement of charge carriers.

Integrated circuits may include transistors, capacitors, resistors and other semiconductor devices. Typically, such devices are fabricated on a substrate and interconnected to form power supplies, memory arrays, logic structures, timers and other components of an integrated circuit. One type of power supply is a step down power supply which is operable to receive an input voltage and step down the input voltage to a specified output voltage.

Conventional step down power supplies include high gain, such as 60 to 80 dB, feedback compensation. High gain feedback compensation generally provides good line regulation and initial accuracy for the step down power supply. However, high gain feedback compensation typically uses up to seven feedback components, including resistors and capacitors. The capacitors may be too large for integration into the step down power supply. Thus, typical step down power supplies using high gain feedback compensation have the feedback components external to the step down integrated circuit. In addition, the transient response associated with high gain feedback compensation is limited due to the dominant pole in the feedback network.

Low gain, such as less than 40 dB, feedback compensation may be used to reduce the number of feedback components, which may also allow integration into the step down integrated circuit. Also, the transient response is not limited by a pole for a typical low gain feedback compensation. However, poor line regulation generally results from low gain feedback compensation for a step down power supply. Furthermore, typical step down power supplies with low gain feedback compensation have initial accuracy errors and burden the designer with solving this problem by having the customer select the resistor values to correct the errors.

SUMMARY OF THE INVENTION

In accordance with the present invention, a system and method for dynamically regulating a step down power supply are provided that substantially eliminate or reduce disadvantages and problems associated with previously developed systems and methods. In a particular embodiment, low gain feedback compensation is provided in a step down power supply with initial accuracy errors minimized and with relatively good line regulation, which is accomplished by introducing an offset voltage.

According to one embodiment of the present invention, a low gain feedback compensation circuit is provided on an integrated circuit. The feedback compensation circuit is coupled to a step down power supply on the integrated circuit. The step down power supply is operable to receive an input voltage and to generate an output voltage based on the input voltage. The feedback compensation circuit includes a line regulation circuit. The line regulation circuit is operable to receive the input voltage and a reference voltage. The line regulation circuit is also operable to generate an offset voltage based on the input voltage and the reference voltage.

According to another embodiment of the present invention, a method for dynamically regulating an output voltage for a step down power supply is provided. The method includes providing a reference voltage to an error amplifier for a low gain feedback compensation circuit. The feedback compensation circuit includes a line regulation circuit. The reference voltage is received at the line regulation circuit. A first input voltage is received at the line regulation circuit. A first offset voltage is provided to the error amplifier based on the first input voltage and the reference voltage. A second input voltage is received at the line regulation circuit. The second input voltage is different from the first input voltage. A second offset voltage is provided to the error amplifier based on the second input voltage and the reference voltage.

Technical advantages of one or more embodiments of the present invention include providing an improved system for dynamically regulating a step down power supply. In a particular embodiment, a current source provides an offset voltage that is a function of the input voltage and the desired output voltage. As a result, the line regulation is improved and initial accuracy errors are minimized.

Other technical advantages of one or more embodiments of the present invention include integrating a feedback compensation circuit that includes a line regulation circuit into a step down integrated circuit. Accordingly, available die area is increased. In addition, the number of components and the output voltage error due to line voltage changes are minimized.

Technical advantages of one or more embodiments of the present invention also include providing a feedback compensation circuit that has only resistors. As a result, capacitors for the feedback compensation circuit do not need to be integrated into the step down integrated circuit.

Other technical advantages will be readily apparent to one skilled in the art from the following figures, descriptions and claims.

BRIEF DESCRIPTION OF THE DRAWINGS

For a more complete understanding of the present invention and its advantages is now made to the following description taken in conjunction with the accompanying drawings, wherein like numerals represent like parts, in which:

FIG. 3 is a graph illustrating a duty cycle for the pulse width modulation comparator of FIGS. 2A or 2B in accordance with one embodiment of the present invention;

FIG. 4A is a schematic diagram illustrating the feedback compensation circuit and the line regulation circuit of FIG. 1 in accordance with one embodiment of the present invention;

FIG. 4B is a flow diagram illustrating a method for configuring the line regulation circuit of FIG. 1 to dynamically regulate the step down power supply of FIG. 1 in accordance with one embodiment of the present invention;

FIG. 4C is a flow diagram illustrating a method for dynamically regulating the step down power supply of FIG. 1 in accordance with one embodiment of the present invention.

DETAILED DESCRIPTION OF THE INVENTION

Figure 1:
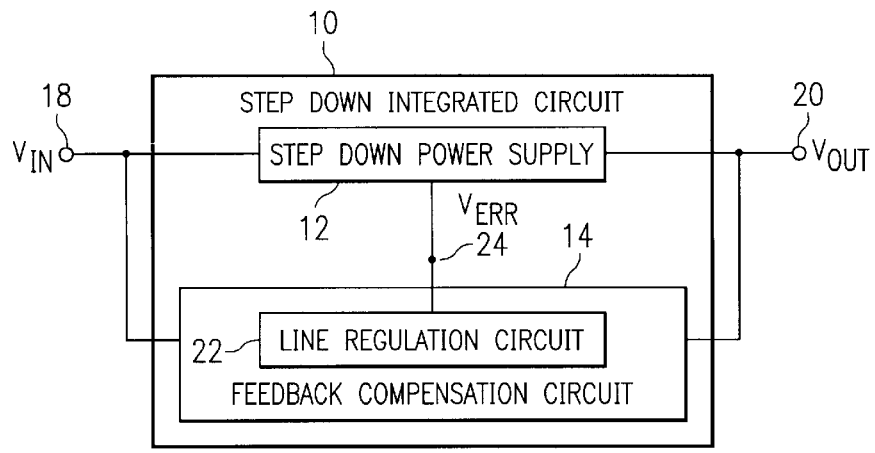
FIG. 1 is a block diagram illustrating a step down integrated circuit in accordance with one embodiment of the present invention.

FIG. 1 is a block diagram illustrating a step down integrated circuit 10 in accordance with one embodiment of the present invention. The integrated circuit 10 may be used as a power supply that is operable to provide a relatively constant voltage to applications such as digital signal processors, field-programmable gate arrays, application-specific integrated circuits, microprocessors and other suitable applications.

The integrated circuit 10 comprises a step down power supply 12 and a feedback compensation circuit 14 formed on an integrated circuit. The step down power supply 12 is operable to step down an input voltage 18 to a lower output voltage 20. For example, the step down power supply 12 may receive an input voltage 18 of approximately 5.0 volts and may generate an output voltage 20 of approximately 3.3 volts. It will be understood, however, that any suitable input voltages 18 may be received and output voltages 20 may be generated without departing from the scope of the present invention.

The feedback compensation circuit 14 is operable to provide feedback from the output voltage 20 to the step down power supply 12. In addition, the feedback compensation circuit 14 comprises a line regulation circuit 22 that is operable to regulate the output voltage 20 based on the input voltage 18.

The feedback compensation circuit 14 comprises a low gain feedback compensation circuit. As used herein, "low gain" means a gain of less than approximately 40 dB. According to one embodiment, the characteristics of an output filter (not shown in FIG. 1) that includes an inductor and a capacitor may be used to stabilize the step down integrated circuit 10.

In operation, the step down power supply 12 receives the input voltage 18 and generates an output voltage 20 based on the input voltage 18. The level of the output voltage 20 may be a function of a duty cycle for the step down power supply 12, which provides the input voltage 18 for a specified period of time during each cycle and which provides a ground voltage for the remainder of each cycle.

The feedback compensation circuit 14 receives both the input voltage 18 and the output voltage 20. Based on the input voltage 18, the line regulation circuit 22 determines an offset voltage to be applied in addition to a reference voltage provided by the feedback compensation circuit 14. The line regulation circuit 22 then generates the offset voltage within the feedback compensation circuit 14 such that an error voltage 24 provided to the step down power supply 12 results in the regulation of the output voltage 20 to the appropriate level.

In this way, the line regulation circuit 22 may generate an offset voltage that dynamically changes based on the input voltage 18, resulting in the minimization of initial accuracy errors and line regulation errors. In addition, the feedback compensation circuit 14 including the line regulation circuit 22 may be integrated with the step down power supply 12 onto the step down integrated circuit 10, providing increased die area for other components.

Figure 2A:
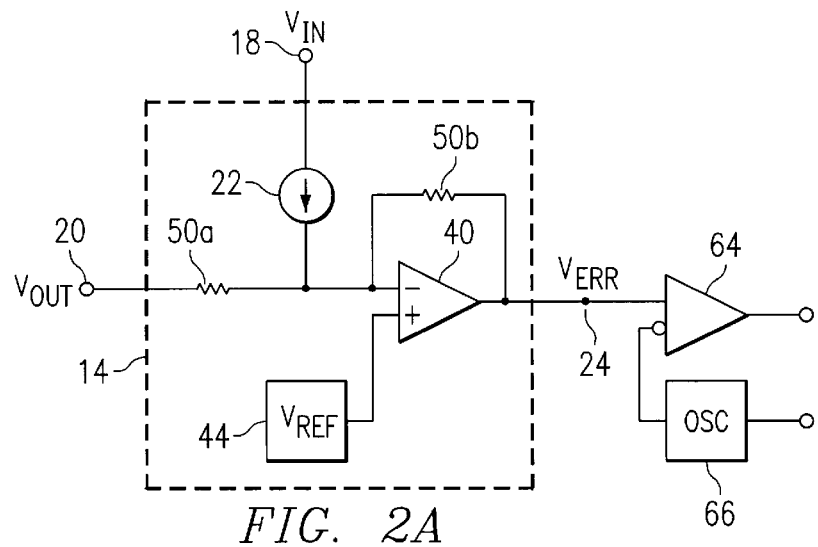
FIG. 2A is a schematic diagram illustrating the feedback compensation circuit of FIG. 1 in accordance with one embodiment of the present invention.

FIG. 2A is a schematic diagram illustrating the feedback compensation circuit 14 in accordance with one embodiment of the present invention. The feedback compensation circuit 14 comprises an error amplifier 40, a reference voltage 44, a plurality of resistors 50, and the line regulation circuit 22. It will be understood that additional components, such as capacitors, may be included in the feedback compensation circuit 14.

In accordance with the illustrated embodiment, the line regulation circuit 22 comprises a current source. It will be understood, however, that the line regulation circuit 22 may be otherwise suitably implemented without departing from the scope of the present invention.

The reference voltage 44 is coupled to the non-inverting node of the error amplifier 40. An input resistor 50a couples the output voltage 20 to the inverting node of the error amplifier 40. A feedback resistor 50b couples the output of the error amplifier 40, which is the error voltage 24, to the inverting node of the error amplifier 40. The line regulation circuit 22 couples the input voltage 18 to the inverting node of the error amplifier 40.

In the illustrated embodiment, the error voltage 24 is coupled to the non-inverting node of a pulse width modulation (PWM) comparator 64, which is part of the step down power supply 12. An oscillator 66, which is also part of the step down power supply 12, is coupled to the inverting node of the PWM comparator 64. Thus, the error voltage 24 and the oscillator 66, in conjunction with a duty cycle for the PWM comparator 64, determine the output for the PWM comparator 64.

According to one embodiment, the oscillator 66 may have an oscillator frequency of approximately 270 to 700 kHz. In a particular embodiment, the oscillator frequency is approximately 350 kHz. In another particular embodiment, the oscillator frequency is approximately 550 kHz. However, it will be understood that the oscillator frequency may comprise any suitable frequency without departing from the scope of the present invention.

In accordance with one embodiment of the present invention, the feedback compensation circuit 14 illustrated in FIG. 2A is operable to regulate a corresponding step down power supply 12 that is generating an output voltage 20 of less than approximately 1.8 volts. In a particular embodiment, the illustrated feedback compensation circuit 14 is operable to regulate a corresponding step down power supply 12 that is generating an output voltage 20 of approximately 0.9, 1.2 or 1.5 volts.

The reference voltage 44 may be operable to provide to the error amplifier 40 a reference voltage of approximately the same voltage as the output voltage 20. In addition, the resistors 50 may comprise a 2 kΩ input resistor 50a and a 40 kΩ feedback resistor 50b. For this embodiment, the feedback compensation circuit 14 may comprise a gain of approximately 26 dB. It will be understood, however, that any suitable values may be used for the resistors 50 and any suitable low gain may be provided by the feedback compensation circuit 14 without departing from the scope of the present invention.

In operation, the line regulation circuit 22 receives the input voltage 18. Based on the input voltage 18, the line regulation circuit 22 provides an offset voltage to the error amplifier 40 by generating a specified current. Thus, if the input voltage 18 subsequently changes, the line regulation circuit 22 generates a different current, which provides a different offset voltage to the error amplifier 40. The new offset voltage allows the same output voltage 20 to be generated by the step down power supply 12 regardless of a change in the input voltage 18.

For the illustrated embodiment, only two resistors 50 and no capacitors are included in the feedback compensation circuit 14. In this way, the feedback compensation circuit 14 may be integrated onto the step down integrated circuit 10 relatively easily, while initial accuracy errors and line regulation errors are minimized by the offset voltage provided through the line regulation circuit 22.

Figure 2B:
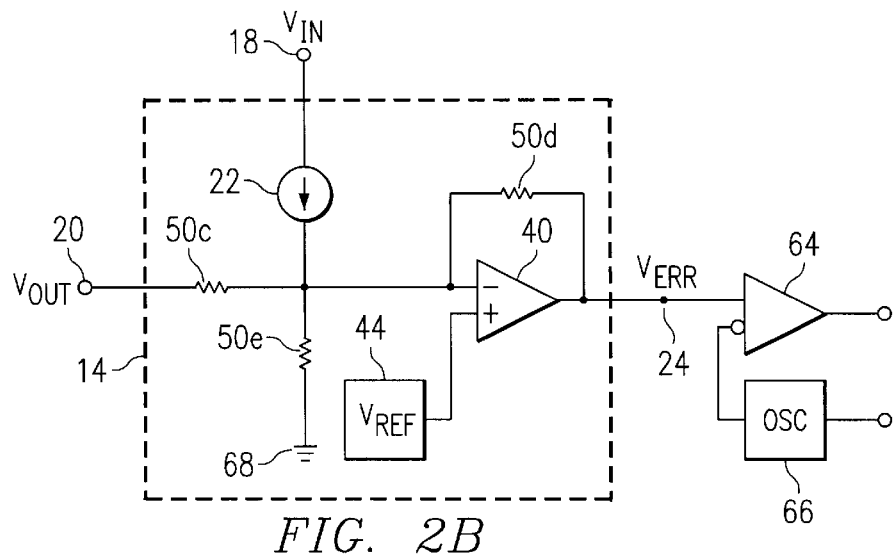
FIG. 2B is a schematic diagram illustrating the feedback compensation circuit of FIG. 1 in accordance with an alternative embodiment of the present invention.

FIG. 2B is a schematic diagram illustrating the line regulation circuit 14 in accordance with an alternative embodiment of the present invention. The line regulation circuit 14 comprises an error amplifier 40, a reference voltage 44, a plurality of resistors 50, and the line regulation circuit 22. It will be understood that additional components, such as capacitors, may be included in the feedback compensation circuit 14.

In accordance with the illustrated embodiment, the line regulation circuit 22 comprises a current source. It will be understood, however, that the line regulation circuit 22 may be otherwise suitably implemented without departing from the scope of the present invention.

The reference voltage 44 is coupled to the non-inverting node of the error amplifier 40. A first input resistor 50c couples the output voltage 20 to the inverting node of the error amplifier 40. A feedback resistor 50d couples the output of the error amplifier 40, which is the error voltage 24, to the inverting node of the error amplifier 40. A second input resistor 50e couples ground 68 to the inverting node of the error amplifier 40. The line regulation circuit 22 couples the input voltage 18 to the inverting node of the error amplifier 40.

According to one embodiment, the ground 68 comprises a potential of approximately 0.0 volts. However, it will be understood that the ground 68 may comprise any suitable potential that is less than potential of the input voltage 18.

In the illustrated embodiment, the error voltage 24 is coupled to the non-inverting node of a PWM comparator 64, which is part of the step down power supply 12. An oscillator 66, which is also part of the step down power supply 12, is coupled to the inverting node of the PWM comparator 64. Thus, the error voltage 24 and the oscillator 66, in conjunction with a duty cycle for the PWM comparator 64, determine the output for the PWM comparator 64.

According to one embodiment, the oscillator 66 may have an oscillator frequency of approximately 270 to 700 kHz. In a particular embodiment, the oscillator frequency is approximately 350 kHz. In another particular embodiment, the oscillator frequency is approximately 550 kHz. However, it will be understood that the oscillator frequency may comprise any suitable frequency without departing from the scope of the present invention.

In accordance with one embodiment of the present invention, the feedback compensation circuit 14 illustrated in FIG. 2A is operable to regulate a corresponding step down power supply 12 that is generating an output voltage 20 of more than approximately 1.5 volts. In a particular embodiment, the illustrated feedback compensation circuit 14 is operable to regulate a corresponding step down power supply 12 that is generating an output voltage 20 of approximately 1.8, 2.5 or 3.3 volts.

The reference voltage 44 may be operable to provide to the error amplifier 40 a reference voltage of approximately 50% of the output voltage 20. For this embodiment, the input resistors 50c and 50e may comprise approximately the same resistance. In one embodiment, the resistors 50 may comprise a 2 kΩ first input resistor 50c, a 2 kΩ second input resistor 50e, and a 40 kΩ feedback resistor 50d. For this embodiment, the feedback compensation circuit 14 may comprise a gain of approximately 26 dB. It will be understood, however, that any suitable values may be used for the resistors 50 and any suitable low gain may be provided by the feedback compensation circuit 14 without departing from the scope of the present invention.

In operation, the line regulation circuit 22 receives the input voltage 18. Based on the input voltage 18, the line regulation circuit 22 provides an offset voltage to the error amplifier 40 by generating a specified current. Thus, if the input voltage 18 subsequently changes, the line regulation circuit 22 generates a different current, which provides a different offset voltage to the error amplifier 40. The new offset voltage allows the same output voltage 20 to be generated by the step down power supply 12 regardless of a change in the input voltage 18.

For the illustrated embodiment, only three resistors 50 and no capacitors are included in the feedback compensation circuit 14. In this way, the feedback compensation circuit 14 may be integrated onto the step down integrated circuit 10 relatively easily, while initial accuracy errors and line regulation errors are minimized by the offset voltage provided through the line regulation circuit 22.

In an alternative embodiment, the reference voltage 44 may be varied based on the input voltage 18 instead of using the line regulation circuit 22 to provide an offset voltage.

FIG. 3 is a graph 70 illustrating a duty cycle 72 for the PWM comparator 64 in accordance with one embodiment of the present invention. The graph 70 illustrates voltage provided by the oscillator 66 to the PWM comparator 64 as a function of time. The graph 70 also illustrates the error voltage 24 provided by the feedback compensation circuit 14, as described in more detail above in connection with FIGS. 1–2.

The voltage from the oscillator 66 varies cyclically from a low voltage 74 to a high voltage 76. As shown in FIG. 3, the PWM comparator 64 is "on" until the voltage from the oscillator 66 reaches the error voltage 24 and "off" until the voltage from the oscillator 66 returns to the low voltage 74. Each duty cycle 72 for the PWM comparator 64 is made up of an on time 82 and an off time 84. While the PWM comparator 64 is "on," the PWM comparator 64 outputs the error voltage 24, and while the PWM comparator 64 is "off," the PWM comparator 64 outputs no signal.

The low voltage 74 and the high voltage 76 may be determined based on the characteristics of the PWM comparator 64. According to one embodiment, the low voltage 74 is approximately 0.75 volts and the high voltage 76 is approximately 1.75 volts. In addition, the difference between the low and high voltages 74 and 76 may be based on the characteristics of the step down power supply 12. According to one embodiment, the difference may be approximately 0.5, 1.0 or 2.0 volts. It will be understood, however, that the low and high voltages 74 and 76 and the difference between them may be any suitable values without departing from the scope of the present invention.

Based on the feedback compensation circuits 14 illustrated in FIGS. 2A and 2B and based on the duty cycle 72 for the PWM comparator 64 illustrated in FIG. 3, the following equations for the step down integrated circuit 10 may be generated:

$$(V_{ref} - V_{out}) * A_v = V_{err} \quad \text{(eqn. 1)}$$

$$V_{err} = (V_H - V_L) * (T_{on}/T) + V_L \quad \text{(eqn. 2)}$$

$$V_{err} = (V_H - V_L) * D + V_L \quad \text{(eqn. 3)}$$

$$V_{err} = (V_H - V_L) * (V_{out}/V_{in}) + V_L \quad \text{(eqn. 4)}$$

$$V_{out} = (A_v * V_{ref} - V_L) / [A_v + (V_H - V_L)/V_{in}] \quad \text{(eqn. 5)}$$

where $V_{ref}$ is the reference voltage 44, $V_{out}$ is the output voltage 20, $A_v$ is the gain of the error amplifier 40, $V_{err}$ is the error voltage 24, $V_H$ is the high voltage 76 from the oscillator 66, $V_L$ is the low voltage 74 from the oscillator 66, $T_{on}$ is the on time 82 for the PWM comparator 64, T is the time corresponding to one duty cycle 72 for the PWM comparator 64 (or the on time 82 added to the off time 84 for one duty cycle 72), D is the duty cycle 72 for the PWM comparator 64, and $V_{in}$ is the input voltage 18.

Thus, Equation 5 provides the output voltage error which results from the low gain feedback on the error amplifier 40. To determine an offset voltage to compensate for this output voltage error, Equation 5 may be solved for $V_{ref}$ at the desired input voltage 18 and at the desired output voltage 20. Then another equation may be generated from the differences in the actual reference voltage 44 and the reference voltage which should be applied to the error amplifier 40 to result in the appropriate output voltage 20, with the equation in the form of:

$$V_{off} = A * V_{in} + B \quad \text{(eqn. 6)}$$

Using the form of Equation 6, offset equations may be solved for a plurality of output voltages 20 in the form of the following equations:

$$V_{off} = A_1 * V_{in} + B_1 \quad \text{(eqn. 7)}$$

$$V_{off} = A_2 * V_{in} + B_2 \quad \text{(eqn. 8)}$$

The A coefficients vary with respect to the output voltage 20 and may be represented by another linear equation in the following form:

$$A = C * V_{out} + D \quad \text{(eqn. 9)}$$

Thus, substituting Equation 9 into Equation 6 yields a single equation that may be used to minimize the offset error over a range of input voltages 18 for a corresponding output voltage 20:

$$V_{off} = (C * V_{out} + D) * V_{in} + B \quad \text{(eqn. 10)}$$

According to one embodiment, as $V_{in}$ changes, the offset voltage changes in accordance with Equation 10. For the feedback compensation circuit 14 illustrated in FIG. 2A, the line regulation circuit 22 generates an offset current to provide the offset voltage determined by Equation 10. This offset current is determined as follows:

$$I_{off} = [V_{off} * (1 + R_f/R_{i1})]/R_f \quad \text{(eqn. 11)}$$

where $I_{off}$ is the offset current, $R_f$ is the resistance of the feedback resistor 50b, and $R_{i1}$ is the resistance of the input resistor 50a.

For the feedback compensation circuit 14 illustrated in FIG. 2B, the line regulation circuit 22 also generates an offset current to provide the offset voltage determined by Equation 10. However, the offset current for this embodiment is determined as follows:

$$I_{off} = V_{off} * (1/R_f + 1/R_{i1} + 1/R_{i2}) \quad \text{(eqn. 12)}$$

where $R_f$ is the resistance of the feedback resistor 50d, $R_{i1}$ is the resistance of the first input resistor 50c, and $R_{i2}$ is the resistance of the second input resistor 50e.

FIG. 4A is a schematic diagram illustrating the feedback compensation circuit 14 and the line regulation circuit 22 in accordance with one embodiment of the present invention. The line regulation circuit 22 comprises an offset voltage function 90. The offset voltage function 90 is operable to receive the input voltage 18 and the reference voltage 44 and is configured to generate an offset voltage based on the input voltage 18 and the reference voltage 44.

According to one embodiment, the offset voltage function 90 is configured in accordance with the method of FIG. 4B. However, it will be understood that the offset voltage function 90 may be otherwise suitably configured without departing from the scope of the present invention. Also, according to one embodiment, the offset voltage function 90 is operable to generate the offset voltage in accordance with the method of FIG. 4C. However, it will be understood that the offset voltage function 90 may otherwise suitably generate the offset voltage without departing from the scope of the present invention.

The feedback compensation circuit 14 comprises an adder 92 that is operable to receive the offset voltage from the offset voltage function 90 and to receive the output voltage 20. Based on the offset voltage from the offset voltage function 90 and the output voltage 20, the adder 92 generates an output for the feedback compensation circuit 14, as illustrated.

FIG. 4B is a flow diagram illustrating a method for configuring the line regulation circuit 22 to dynamically regulate the step down power supply 12 in accordance with one embodiment of the present invention. The method begins at step 100 where an output voltage error is determined for the line regulation circuit 22. According to one embodiment, the output voltage error is determined based on Equation 5, above.

At step 102, an equation for calculating an offset voltage is determined based on the reference voltage and the output voltage error determined in step 100. According to one embodiment, the offset voltage equation comprises Equation 10, above.

In this way, an offset voltage equation may be determined for the line regulation circuit 22. The line regulation circuit 22 may then be configured in accordance with the offset voltage equation such that the input voltage 18 received by the line regulation circuit 22 results in the appropriate offset voltage being generated by the line regulation circuit 22 for the feedback compensation circuit 14.

FIG. 4C is a flow diagram illustrating a method for dynamically regulating the step down power supply 12 in accordance with one embodiment of the present invention. The method begins at step 104 where the line regulation circuit 22 determines the offset voltage based on the input voltage 18 received at the line regulation circuit 22 and an offset voltage equation. According to one embodiment, the offset voltage equation is determined in accordance with step 102 of FIG. 4B. Thus, the line regulation circuit 22 may determine the offset voltage based on the configuration of the line regulation circuit 22, which is based on the offset voltage equation, in conjunction with the input voltage 18.

At step 106, the line regulation circuit 22 provides an offset current to the feedback compensation circuit 14 based on the offset voltage determined in step 104. According to the embodiment illustrated in FIG. 2A, the offset current may be determined based on Equation 11, above. According to the embodiment illustrated in FIG. 2B, the offset current may be determined based on Equation 12, above. It will be understood that the line regulation circuit 22 may provide the offset current based on the configuration of the line regulation circuit 22, which may be accomplished in accordance with the method of FIG. 4B.

At decisional step 108, the line regulation circuit 22 determines whether or not the input voltage 18 has changed. If the input voltage 18 has not changed, the method follows the No branch from decisional step 108 and returns to the same step to monitor the input voltage 18 for a change.

If the input voltage 18 has changed, the method follows the Yes branch from decisional step 108 and returns to step 104 where a new offset voltage is determined based on the new input voltage. The method then continues to step 106 where the line regulation circuit 22 provides a new offset current to the feedback compensation circuit 14 based on the new offset voltage determined in step 104 before monitoring the input voltage 18 for another change. In this way, the line regulation circuit 22 may continuously monitor the input voltage 18 in order to dynamically generate an appropriate offset voltage for the feedback compensation circuit 14.

Figure 5A:
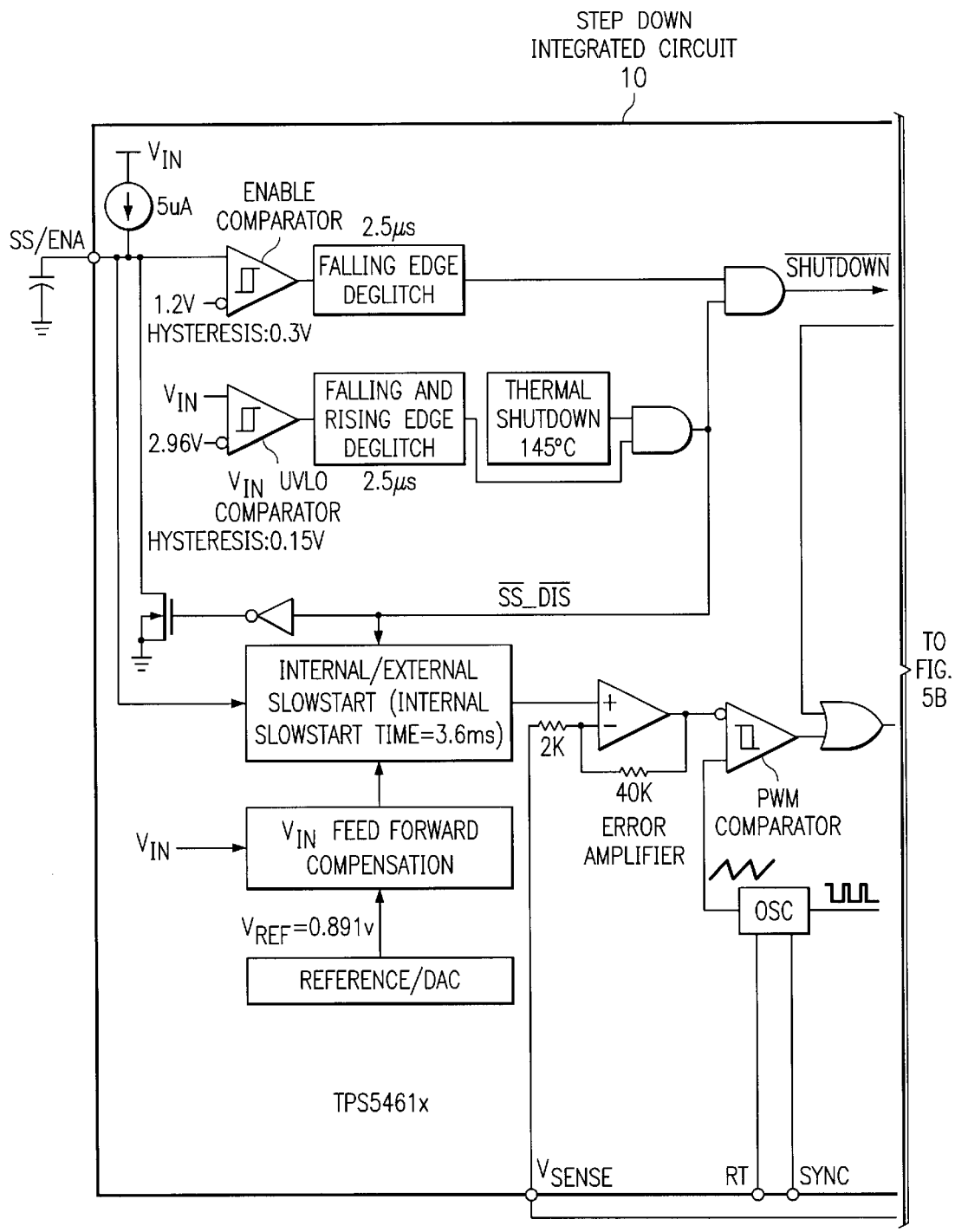
FIGS. 5A and B are a schematic diagram illustrating details of the step down integrated circuit of FIG. 1 in accordance with one embodiment of the present invention.
Figure 5B:
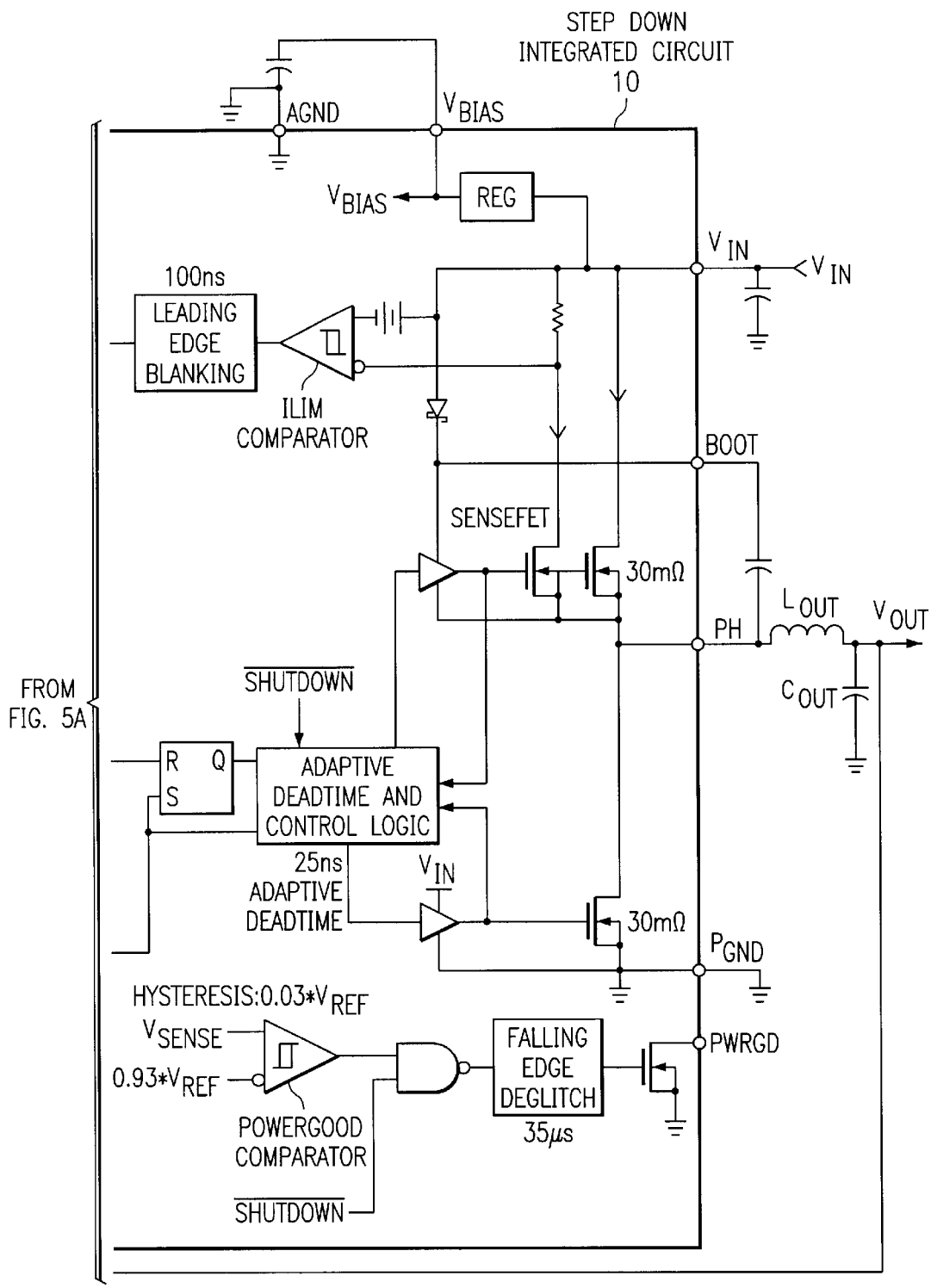

FIG. 5 is a schematic diagram illustrating details of the step down integrated circuit 10 in accordance with one embodiment of the present invention. For this embodiment, the input voltage 18 may vary from approximately 2.7 to 5.0 volts, the output voltage 20 may vary from approximately 1.8 to 3.3 volts, the reference voltage 44 is approximately 0.891 volts, the input resistor 50a comprises approximately 2 kΩ, and the feedback resistor 50b comprises approximately 40 kΩ. However, it will be understood that the step down integrated circuit 10 may be otherwise suitably implemented without departing from the scope of the present invention.

Although the present invention has been described with several embodiments, various changes and modifications may be suggested to one skilled in the art. It is intended that the present invention encompass such changes and modifications as fall within the scope of the appended claims.

What is claimed is:

1. A low gain feedback compensation circuit on an integrated circuit, the feedback compensation circuit coupled to a step down power supply on the integrated circuit, the step down power supply operable to receive an input voltage and to generate an output voltage based on the input voltage, the feedback compensation circuit comprising a line regulation circuit operable to receive the input voltage and a reference voltage and operable to generate an offset voltage based on the input voltage and the reference voltage, the line regulation circuit comprising a current source.

2. A low gain feedback compensation circuit on an integrated circuit, the feedback compensation circuit coupled to a step down power supply on the integrated circuit, the step down power supply operable to receive an input voltage and to generate an output voltage based on the input voltage, the feedback compensation circuit comprising a line regulation circuit operable to receive the input voltage and a reference voltage and operable to generate an offset voltage based on the input voltage and the reference voltage, and further comprising:

an error amplifier coupled to the line regulation circuit;
the reference voltage coupled to the error amplifier; and
the line regulation circuit further operable to provide the offset voltage to the error amplifier.

3. The circuit of claim 2, the error amplifier operable to provide a gain of approximately 26 dB.

4. A low gain feedback compensation circuit on an integrated circuit, the feedback compensation circuit coupled to a step down power supply on the integrated circuit, the step down power supply operable to receive an input voltage and to generate an output voltage based on the input voltage, the feedback compensation circuit comprising a line regulation circuit operable to receive the input voltage and a reference voltage and operable to generate an offset voltage based on the input voltage and the reference voltage, and further comprising a single feedback resistor and a single input resistor.

5. A low gain feedback compensation circuit on an integrated circuit, the feedback compensation circuit coupled to a step down power supply on the integrated circuit, the step down power supply operable to receive an input voltage and to generate an output voltage based on the input voltage, the feedback compensation circuit comprising a line regulation circuit operable to receive the input voltage and a reference voltage and operable to generate an offset voltage based on the input voltage and the reference voltage, and further comprising a single feedback resistor and two input resistors.

6. A system for dynamically regulating a step down power supply, comprising:

a step down power supply on an integrated circuit, the step down power supply operable to receive an input voltage and to generate an output voltage based on the input voltage; and a low gain feedback compensation circuit on the integrated circuit, the feedback compensation circuit coupled to the step down power supply and operable to receive the input voltage, the feedback compensation circuit comprising a line regulation circuit operable to receive the input voltage and a reference voltage and operable to generate an offset voltage based on the input voltage and the reference voltage.

7. The system of claim 6, the line regulation circuit comprising a current source.

8. The system of claim 6, the feedback compensation circuit further comprising an error amplifier coupled to the line regulation circuit, the reference voltage coupled to the error amplifier, and the line regulation circuit further operable to provide the offset voltage to the error amplifier.

9. The system of claim 8, the error amplifier operable to provide a gain of approximately 26 dB.

10. The system of claim 6, the feedback compensation circuit further comprising a single feedback resistor and a single input resistor.

11. The system of claim 6, the feedback compensation circuit further comprising a single feedback resistor and two input resistors.

12. A method for dynamically regulating an output voltage for a step down power supply, comprising:

providing a reference voltage to an error amplifier for a low gain feedback compensation circuit, the feedback compensation circuit comprising a line regulation circuit;

receiving the reference voltage at the line regulation circuit;

receiving a first input voltage at the line regulation circuit;

providing a first offset voltage to the error amplifier based on the first input voltage and the reference voltage;

receiving a second input voltage at the line regulation circuit, the second input voltage different from the first input voltage; and providing a second offset voltage to the error amplifier based on the second input voltage and the reference voltage.

13. The method of claim 12, the feedback compensation circuit further comprising a single feedback resistor and two input resistors.

14. The method of claim 12, the line regulation circuit comprising a current source.

15. The method of claim 12, further comprising:

determining an output voltage error for the line regulation circuit; and determining an offset voltage equation based on the reference voltage and the output voltage error.

16. The method of claim 15, further comprising:

determining the first offset voltage based on the first input voltage, the reference voltage, and the offset voltage equation; and determining the second offset voltage based on the second input voltage, the reference voltage, and the offset voltage equation.

17. The method of claim 15, the reference voltage approximately the same as the output voltage.

18. The method of claim 12, the feedback compensation circuit further comprising a single feedback resistor and a single input resistor.

19. The method of claim 12, further comprising providing a gain for the feedback compensation circuit of approximately 26 dB with the error amplifier.

* * * * *